C. F. PIKE.
FISH TRAP.
APPLICATION FILED SEPT. 11, 1909.
972,232.
Patented Oct. 11, 1910.
2 SHEETS—SHEET 1.
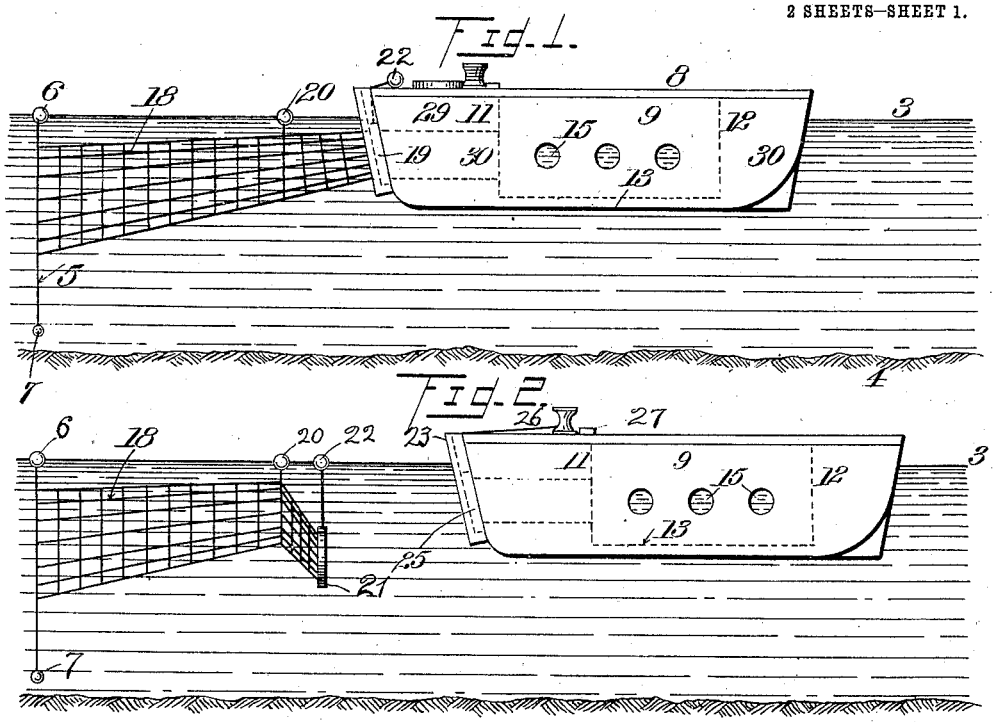
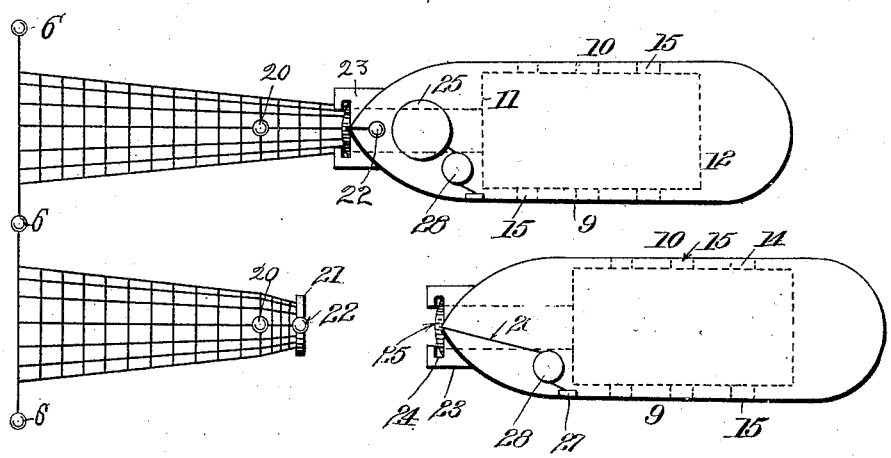
Witnesses
E. E. Duffy
John Devlin
Inventor
Charles F. Pike.
by Wm. A. Pike
Attorneys C. F. PIKE.
FISH TRAP.
APPLICATION FILED SEPT. 11, 1909.
972,232.
Patented Oct. 11, 1910.
2 SHEETS—SHEET 2.
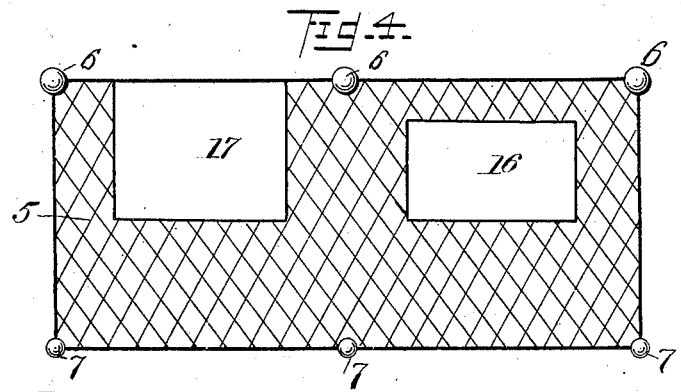
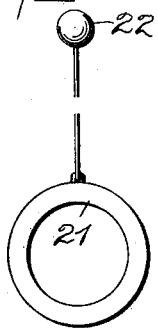
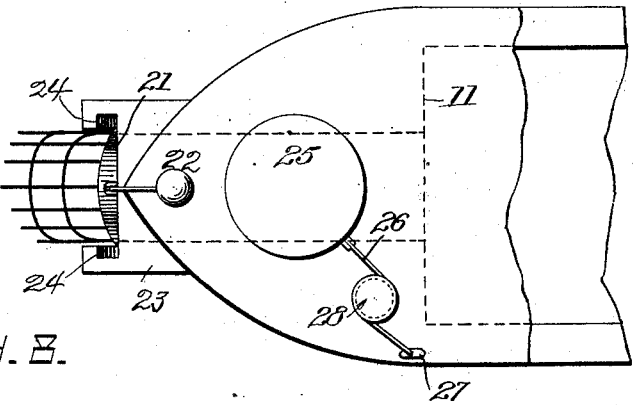
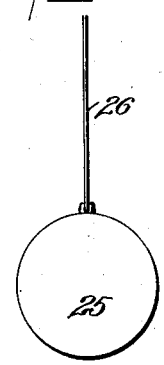
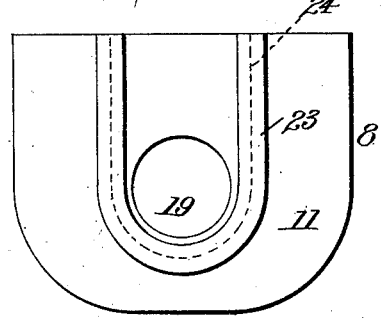
Witnesses
E. C. Duffy
John Devlin
Inventor
Charles F. Pike
by A. Mark
Attorneys

UNITED STATES PATENT OFFICE.

CHARLES F. PIKE, OF PHILADELPHIA, PENNSYLVANIA.

FISH-TRAP.

972,232.  Specification of Letters Patent. Patented Oct. 11, 1910.

Application filed September 11, 1909. Serial No. 517,252.

*To all whom it may concern:*

Be it known that I, CHARLES F. PIKE, a citizen of the United States, residing at Philadelphia, in the county of Philadelphia and State of Pennsylvania, have invented certain new and useful Improvements in Fish-Traps, (Case I,) of which the following is a specification.

My invention relates to devices for catching fish.

In this art as heretofore developed means have been provided for this purpose which comprise in general terms obstructions, such as nets or seines, placed in the path traveled by the fish, and in the rear thereof receptacles with forward openings coinciding with openings in the obstructions, whereby the fish upon encountering the obstruction will pass through the opening therein into the receptacle in the rear thereof.

The object of the present invention is to provide means whereby the necessity of transferring fish from the net in which they have been caught to a vessel while at sea is obviated and with this object in view my invention consists in the improved construction, arrangement and combination of parts hereinafter fully described and afterward specifically claimed.

I have illustrated my invention in the accompanying drawings, in which—

Figure 1 is a side elevation of an obstruction and an attached receptacle or trap for receiving the fish. Fig. 2 is a similar view of the same parts with the connection cast off. Fig. 3 is a top plan view showing an obstruction with a trap connected thereto and by the side thereof a disconnected trap. Fig. 4 is a front view of an obstruction in the form of a seine. Figs. 5, 6, 7 and 8 illustrate details in the construction and arrangement of the apparatus.

Like reference characters mark the same parts in all the figures of the drawings.

Referring specifically to the drawings, 3 indicates the surface and 4 the bottom of a body of water in which the apparatus is to be operated.

An obstruction, in this instance, an ordinary seine, is shown at 5 supported by floats 6 of any ordinary kind at the surface of the water and held down by any ordinary weights or sinkers 7 at the bottom.

At 8 is shown a trap in the form of a floating box or live box which is composed of sides 9, 10, ends 11, 12, bottom 13. This live trap is shown as of the form of a boat but such form may be varied within the scope of my invention. The sides of the trap 8 are shown as perforated or provided with openings 15 to admit of the free flow of water through them but other means might be used to accomplish the same results.

The obstruction 5 may be provided with an opening 16 below the top thereof, or an opening 17 extending from the float line at the top downward, both as shown in Fig. 4. From each of these openings a tubular passage or guide of seines or other net work 18 extends rearwardly and is adapted to be connected with the trap 8 to register with an opening 19 in the forward end or bow thereof. This tubular guide 18 is provided at a slight distance from its rear end with a float 20 and at its rear end with a ring 21 having a float 22 attached thereto.

The trap 8 is provided with an extension 23 at its forward end through which the opening 19 is made and which is also provided with slide grooves 24 to receive the ring 21 and permit of its easy attachment to and removal from the trap, such slide way being shown in detail in Fig. 7. When the trap is detached from the tubular guide, as shown in Figs. 2 and 3, the opening 19 may be closed by means of a disk 25 of substantially the outline of the ring 21 and which may be placed in the slide way 24, the disk being secured to the trap 8 by means of a cord or rope 26 secured to a suitable cleat 27 and may be passed around a capstan 28 or suitable cleat. In the lower part of Fig. 3 I have shown the disk in position closing the opening 19 while in the upper part of that figure and in Fig. 1 I have shown the disk withdrawn and lying upon the top of the trap 8 while the ring 21 is in position in the slide way connecting the tubular guide with the trap.

The trap 8 is made buoyant, in this instance, by providing it with air chambers 29 and 30 at the bow and stern, and a passage 31 leads from the opening 19 into the main body of the trap whereby the fish which pass through the tubular guide may reach the interior.

In operation, the obstruction 5 is placed in the path of the fish, the disk 25 removed from the position shown in Fig. 2 and in the lower half of Fig. 3, to that shown in Fig. 1 and in the upper half of Fig. 3, the ring 21 being slipped into the slide grooves 24 securely attaching the tubular guide 18 to the trap or receptacle 8. When a sufficient quantity of fish have been secured in the trap or receptacle 8, the ring 21 is removed from the slide way 24 and dropped overboard, being held up by the float 22, as shown in Fig. 2. The disk 25 is now passed into the slide grooves 24 thus closing the opening 19 and passage 30 and preventing the escape of fish therethrough. The receptacle may now be towed into any desired position at which the fish may be removed thereby. The receptacle being in the form of a boat, it is obvious that power may be installed therein, thus dispensing with the necessity of towing it from place to place. The receptacle 8 will be made of sufficient size and strength to be seaworthy and resist the action of waves in the open sea.

While I have specifically described the construction of the various parts of this apparatus, it will be obvious to those skilled in the art, that the spirit of the invention is broader than any specific construction, variations in the form of the parts being possible without departing from the scope of the invention.

Having described my invention, what I claim as new and desire to secure by Letters Patent, is—

1. In an apparatus for catching fish, the combination with an obstruction adapted to be placed in the path of the fish and provided with an opening, a sea going receptacle in the rear thereof in the form of a live box and having an opening therein, of a direct connection between the obstruction and the receptacle registering with the openings therein, substantially as described.

2. In an apparatus for catching fish, the combination with an obstruction adapted to be placed in the path of the fish and provided with an opening, a sea going receptacle in the rear thereof in the form of a live box and having an opening therein, of a tubular passage way leading from the opening in the obstruction to the opening in the receptacle and provided with means for attachment to and detachment from the receptacle, substantially as described.

3. In an apparatus for catching fish, the combination with an obstruction adapted to be placed in the path of the fish and provided with an opening, a sea going receptacle in the rear thereof in the form of a live box and having an opening therein, of a tubular passage way leading from the opening in the obstruction to the opening in the receptacle, and provided with floats and means for attachment to and detachment from the receptacle, substantially as described.

4. In an apparatus for catching fish, the combination with an obstruction adapted to be placed in the path of the fish and provided with an opening, a sea going receptacle in the rear thereof in the form of a live box and having an opening therein, a vertical slide way in front of said opening, a tubular guide way connecting the opening in the obstruction with the opening in the receptacle, and a ring fitted in the tube end of the rear guide way and adapted to fit in the slide way in the receptacle, said ring being provided with a float, substantially as described.

5. In an apparatus of the character described, a sea going live box in the form of a boat, provided with an air chamber at its forward end, a passage way leading through said air chamber from the body of the receptacle to an opening in its forward end, a slide way at the forward end of the receptacle, and a disk attached to the receptacle and adapted to be placed in the slide way to close the opening, in combination with an obstruction in the path of the fish having an opening therein, a tubular guide leading rearwardly from the opening in the obstruction and a float ring attached to the rear end of the tubular guide and adapted to be placed in the slide way of the receptacle to connect its passage way with the tubular guide and the opening in the obstruction, substantially as described.

In testimony whereof I affix my signature in presence of two witnesses.

CHARLES F. PIKE.

Witnesses:
Wm. A. Pike,
John Devlin.